Oct. 13, 1936.  W. G. MYLIUS ET AL  2,057,443
WATT-HOUR METER
Original Filed March 23, 1935
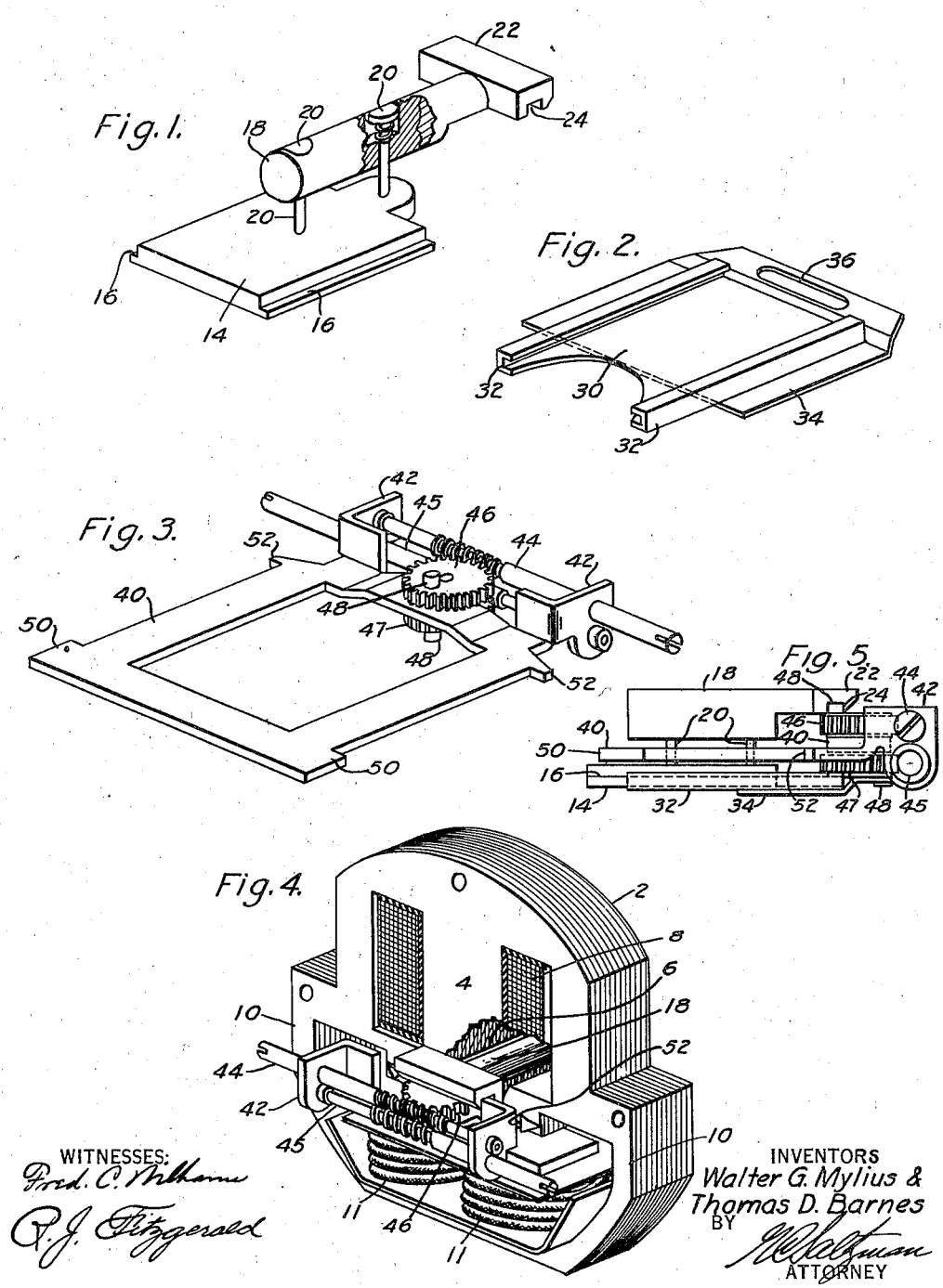
INVENTORS
Walter G. Mylius &
Thomas D. Barnes
BY
ATTORNEY Patented Oct. 13, 1936

2,057,443

UNITED STATES PATENT OFFICE 2,057,443

WATT-HOUR METER

Walter G. Mylius, Summit, and Thomas D. Barnes, Newark, N. J., assignors to Westinghouse Electric & Manufacturing Company, East Pittsburgh, Pa., a corporation of Pennsylvania Application March 23, 1935, Serial No. 12,572
Renewed July 3, 1935

13 Claims. (Cl. 171—34)

The present invention relates to watt-hour meters and more particularly to an improved device for adjusting the magnitude and phase angle of the magnetic flux of a watt-hour meter electromagnet, or the electromagnet of any instrumentality of the induction-disk type.

The invention is particularly adapted for calibrating watt-hour meters of the multi-element type, such as are used for polyphase metering, although as will appear hereinafter, it is applicable also to watt-hour meters of the single-element or single-phase type, or to relays or other instrumentalities operating on the induction principle.

In a multi-element watt-hour meter it is usual to provide two or three disk armatures mounted on a common shaft and separately energized electromagnets associated with such disks to generate the necessary driving torque. It is important in a construction of this character that the torques of the various elements for a given power input shall be equal, and this necessitates a careful calibration of each element to correct for the unavoidable variations which occur in the manufacture thereof. In addition, it is necessary to properly lag the potential flux in each element to maintain the desired quadrature between the potential and current fluxes.

It is an object of the present invention to provide a unitary assembly which may be applied as a unit to the pole portion of the voltage core of a watt-hour meter electromagnet, including means for varying the effective torque of the meter element and for adjusting the phase angle of the potential flux with respect to the phase angle of the current flux. In the construction hereinafter described, the two adjustments may be made independently of each other although the elements for accomplishing these adjustments are interrelated to produce a unitary device.

Other objects of the invention will be apparent from the following description read in conjunction with the accompanying drawing, wherein.

Figure 1 is a view in perspective of a torque equalizer for a watt-hour meter driving magnet in accordance with the present invention, Fig. 2 is a view in perspective of a phase angle or "lag" adjustment, in accordance with the present invention, Fig. 3 is a view in perspective of a "lag plate" for cooperation with the elements shown in Figs. 1 and 2, Fig. 4 is a view in perspective of a watt-hour meter electromagnet upon which the devices of Figs. 1, 2 and 3 are mounted, and Fig. 5 is a view in perspective of the elements shown in Figs. 1, 2 and 3 in assembled relation.

Referring first to Fig. 4, the portion of the watt-hour meter electromagnet shown comprises a laminated core 2 having a pole portion 4 and an aperture 6 extending therethrough. The pole portion is slotted in its end to afford communication to one side of the aperture 6.

A voltage winding 8 is disposed upon the core portion 4, in accordance with usual practice.

Core portions 10 extend downwardly and toward each other and constitute a bridge for supporting integral pole portions extending toward the core 4 adapted to receive current windings 11 in accordance with the usual practice. There is, therefore, a gap between the ends of the current cores and the pole portion 4 of the voltage core, and a usual disk armature is mounted for rotation in such gap.

All of the foregoing, with the exception of the aperture 6 in the pole portion 4, is in accordance with usual practice, and it is believed that no further discussion thereof is necessary.

Referring to Fig. 1, the torque equalizing device comprises a steel plate 14 having longitudinally extending flanges 16 thereon for a purpose hereinafter described. The plate 14 is associated with a round bar 18 of any suitable material which is of such diameter that it may freely slide through the aperture 6 in the voltage core 2. Two steel pins 20 extend through the bar 18 and enter into suitable holes formed in the top of the plate 14 in press-fit engagement. As shown on the right-hand pin 20 of Fig. 1, a recess is provided in the bar 18 beneath the head of each pin 20, and a spiral spring is disposed in each recess for the purpose of making a resilient connection between the bar 18 and the plate 14, tending to draw the plate 14 toward the bar, thereby causing the plate to be held up firmly against the potential pole face, as hereinafter explained.

The free end of the bar 18 is provided with a laterally extending portion 22 having a slot 24 extending along its major axis for a purpose hereinafter described.

Referring to Fig. 2, the phase-angle or "lag" adjuster comprises a plate 30 having channels 32 formed on its longitudinal edges and spaced a sufficient distance to receive the plate 14 of Fig. 1 in sliding relation. The plate 30 may be of copper or other suitable conducting material and is mounted upon a steel plate 34, as by soldering or other suitable means. The plate 34 is provided at its free end with a slot 36 for a purpose hereinafter described.

It is usual practice, in watt-hour meter constructions, to provide a copper strip or ring surrounding the pole portion of the voltage core to effect a lag in the voltage flux to bring about the required quadrature with the current flux. Referring to Fig. 3, a plate 40 of substantially rectangular shape is provided with an enlarged hole through the center thereof proportioned to embrace the pole portion 4 of the voltage magnet 2 for effecting such quadrature relation.

The plate 40 is provided with extensions 42 at one end thereof for journaling a pair of worms 44 and 45, which may be turned by a screw driver or similar instrumentality.

The worm 44 is in driving engagement with a worm wheel 46 and the worm 45 is in driving engagement with a worm wheel 47. The worm wheels 46 and 47 are independently rotatable about a common axis and each is provided with an eccentrically mounted pin 48.

The elements shown in Figs. 1, 2 and 3 are assembled into the position shown in Fig. 5 by mounting the plate 34 of Fig. 2, so that the slot 36 receives the pin 48 on the worm wheel 47, inserting the steel plate 14 of Fig. 1 within the guides 32 of the plate 30, in such position that the steel pins 20 extend upwardly through the lag plate 40 of Fig. 3, so that the groove 24 in the portion 22 of Fig. 1 embraces the upper pin 48 of the worm wheel 46.

It should be apparent referring to Fig. 5, that the torque equalizing plate 14 may be moved with the guide bar 18 by turning the upper worm 44. Such movement will not affect the position of the plate 30, because of the slidable connection between these two elements. On the other hand, the plate 30 may be moved by turning the lower worm 45 and such movement will not affect the position of the plate 14 for the same reason.

In mounting the assembly of Fig. 5 on the watt-hour meter core, the guide bar 18 is inserted through the aperture 6 of the potential core 2 until the plate 40 embraces the pole portion 4 of the core. By reason of the spring connection between the pins 20 and the bar 18 (Fig. 1), sufficient play between the bar 18 and the associated structure is obtained to permit assembling the plate 40 into operative position, and, when the assembly is mounted in operative position, these springs act to resiliently hold the plate 14 against the face of the potential pole 4.

It will be noted in Fig. 3 that the plate 40 is provided with enlarged portions 50 on the front thereof, which will overlie portions 51 of the magnet core. The rear of the plate 40 is provided with projecting portions 52 which similarly abut the face of the core on the opposite side thereof. This is indicated in Fig. 4.

When the plate 40 has been moved to its final position, the edge of the first one or two laminations adjacent the portions 50 may be bent upwardly to retain the assembly in position and similarly the edge of laminations on the rear of the magnet, as viewed in Fig. 4, may be bent to engage the portions 52 of the plate 40.

When the structure is in operating position, the torque equalizing plate 14 is relatively close to the face of the pole portion 4 and may slide across such face guided in its movement by the bar 18 passing through the aperture 6. Similarly, the phase angle adjusting plate 30 slides across the face of the pole portion 4 and cooperates with the fixed plate 40 to provide a vernier adjustment for the phase lagging effect of the plate 40.

As the plate 14 is moved across the face of the disk, it varies the width of the flux gap between the pole portion 4 and the associated current pole portions situated below it to thereby increase or decrease the effective flux.

Similarly, movement of plate 30 across the potential core face is effective to increase or decrease the lag in the potential flux cutting the disk armature. It should be noted that movement of either plate will be along a radial of the disk armature, thereby avoiding any tendency to cause a voltage creep which would result if they moved to either side of a radial.

It should be apparent from the foregoing that in accordance with the present invention, a compact assembly is provided for mechanically effecting two adjustments, namely, the effective torque of a watt-hour meter element and the phase angle relation of the potential flux with respect to the current flux. These adjustments may be made independently merely by inserting a screw driver into the slot of the appropriate worm, and effect a substantial saving in time in calibrating meters as they leave the factory, and making subsequent adjustments in the field.

Quite obviously, the form of device shown is susceptible to many modifications, and it is contemplated that the invention should be limited only by the prior art and the appended claims.

We claim as our invention:

1. In an electromagnet including a core having a pole portion and a winding for inducing a magnetic flux in said core, a member proportioned to embrace said poll portion for lagging the phase-angle of the flux emanating from said pole portion, means carried by said member for varying the magnitude of said flux, and additional means carried by said member for cooperation therewith to vary the flux-lagging effect of said member.

2. In an electromagnet including a core having a pole portion and a winding for inducing a magnetic flux in said core, a member proportioned to embrace said pole portion for lagging the phase-angle of the flux emanating from said pole portion, means carried by said member for varying the magnitude of such flux, and additional means carried by said member for cooperation therewith to vary the flux-lagging effect of said member; said last-named means being slidably mounted on said means for varying the flux magnitude.

3. In an electromagnet including a core having a pole portion and a winding for inducing a magnetic flux in said core, a member proportioned to embrace said pole portion for lagging the phase-angle of the flux emanating from said pole portion, means carried by said member and mounted for movement across the face of said pole portion for varying the magnitude of the flux emanating therefrom, means for adjustably moving said means, and means mounted on said first-named means and movable independently thereof for adjusting the flux-lagging effect of said member.

4. In combination with an electromagnet having a core terminating in a pole portion and a winding for inducing a magnetic flux in said core, of a conductor of loop-shape surrounding said pole portion, a member of magnetic material movably mounted adjacent to the face of said pole portion, means for guiding the movement of said member across said pole face, a plate of conducting material slidably mounted on said member for movement across said pole face, and means carried by said conductor of loop-shape for adjustably moving said member and plate.

5. In combination with an electromagnet having a core terminating in a pole portion and a winding for inducing a magnetic flux in said core, of a conductor of loop-shape surrounding said pole portion, a member of magnetic material movably mounted adjacent to the face of said pole portion, means for guiding the movement of said member across said pole face, a plate of conducting material slidably mounted on said member for movement across said pole face, and means carried by said conductor of loop-shape for adjustably moving said member and plate independently of each other.

6. In combination with an electromagnet having a core terminating in a pole portion and a winding for inducing a magnetic flux in said core, of a conductor of loop-shape surrounding said pole portion, a member of magnetic material movably mounted adjacent to the face of said pole portion, means for guiding the movement of said member across said pole face comprising a bar slidably related to said core and secured to said member, a plate of conducting material slidably mounted on said member for movement across said pole face, and means carried by said conductor of loop-shape for adjustably moving said member and plate.

7. In an electromagnet including a core having a pole portion and a winding for inducing a magnetic flux in said core, a member proportioned to embrace said pole portion for lagging the phase-angle of the flux emanating from said pole portion, means carried by said member for varying the magnitude of such flux, additional means carried by said member for cooperation therewith to vary the flux-lagging effect of said member, and means for adjusting the positions of both of said means independently of each other.

8. In an electromagnet including a core having a pole portion and a winding for inducing a magnetic flux in said core, a member proportioned to embrace said pole portion for lagging the phase-angle of the flux emanating from said pole portion, means carried by said member for varying the magnitude of such flux, additional means carried by said member for cooperation therewith to vary the flux-lagging effect of said member, and means for adjusting the positions of both of said means independently of each other including a worm and worm wheel for each means supported by said member and a pin-and-slot connection between each worm wheel and its associated means.

9. In an electromagnet including a core having a pole portion and a winding for inducing a magnetic flux in said core, a member proportioned to embrace said pole portion for lagging the phase-angle of the flux emanating from said pole portion, means carried by said member for varying the magnitude of such flux, additional means carried by said member for cooperation therewith to vary the flux-lagging effect of said member, and means for adjusting the positions of both of said means independently of each other including a worm and worm wheel for each means supported by said member, a pin eccentrically mounted on each worm wheel and a slot in each of said means for receiving the respective pins.

10. In an alternating-current electromagnet including a core having a pole portion and a winding for inducing a magnetic flux in said core, a unitary structure disposed adjacent to said pole portion including a member for lagging the phase-angle of said flux by a fixed amount and independently adjustable means for varying the flux-lagging effect of said member and the magnitude of the flux emanating from said pole portion.

11. In an alternating-current electromagnet including a core having a pole portion and a winding for inducing a magnetic flux in said core, a unitary structure including a loop of conducting material proportioned to embrace said pole portion to lag the phase angle of said flux, means for varying the flux-lagging effect of said loop and means for varying the magnitude of said flux; said last two means being independently adjustable and each movable only in one direction.

12. In an alternating-current electromagnet including a core having a pole portion and a winding for inducing a magnetic flux in said core, a short-circuited conductor surrounding said pole portion for lagging the phase-angle of said flux, means mounted for movement across the face of said pole portion for varying the magnitude of said flux, and means for guiding the movement of said last named means and for biasing it toward the face of said pole portion.

13. In an alternating-current electromagnet including a core having a pole portion and a winding for inducing a magnetic flux in said core, a unitary structure including independently movable means for adjusting the magnitude of the flux from said pole portion and the phase-angle thereof, and means for securing said device in operative position with respect to said pole portion.

WALTER G. MYLIUS.
THOMAS D. BARNES.